United States Patent
Bordawekar (10) Patent No.: US 10,380,183 B2
(45) Date of Patent: Aug. 13, 2019

(54) BUILDING AND QUERYING HASH TABLES ON PROCESSORS

(71) Applicant: International Business Machines Corporation, Armonk, NY (US)

(72) Inventor: Rajesh R. Bordawekar, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 411 days.

(21) Appl. No.: 14/244,468

(22) Filed: Apr. 3, 2014

(65) Prior Publication Data

US 2015/0286639 A1    Oct. 8, 2015

(51) Int. Cl.
*G06F 16/30*     (2019.01)
*G06F 16/901*    (2019.01)

(52) U.S. Cl.
CPC .............................. *G06F 16/9014* (2019.01)

(58) Field of Classification Search
None
See application file for complete search history.

(56) References Cited

U.S. PATENT DOCUMENTS

| | | | |
|---|---|---|---|
| 9,104,678 B1* | 8/2015 | Nemes | G06F 17/30097 |
| 2006/0143168 A1* | 6/2006 | Rossmann | G06F 17/30949 |
| 2012/0011108 A1* | 1/2012 | Bensberg | G06F 17/3033 707/714 |
| 2012/0054467 A1* | 3/2012 | Fulton | G06F 17/30949 711/216 |
| 2014/0330801 A1* | 11/2014 | Kaldewey | G06F 17/3033 707/698 |

* cited by examiner

*Primary Examiner* — Irete F Ehichioya
*Assistant Examiner* — Johnese T Johnson
(74) *Attorney, Agent, or Firm* — Scully, Scott, Murphy & Presser, P.C.; Rahan Uddin (57) ABSTRACT

A plurality of memory maps may be allocated that represents the hash table on a memory device to store keys and values. The memory maps may comprise at least a primary map and a secondary map. A hash table operation may be performed on the primary map based on a first position computed using a first hash function, and if not successful, a bounded linear probing that probes a defined primary probe region in the primary map. Responsive to determining that the hash table operation on the primary map is not successful, the hash table operation may be performed on the secondary map based on a second position computed using a second hash function, and if not successful, a bounded linear probing that probes a defined secondary probe region in the secondary map.

18 Claims, 8 Drawing Sheets

BUILDING AND QUERYING HASH TABLES ON PROCESSORS

FIELD

The present application relates generally to computers and processors, and more particularly to hashing on processors, e.g., a multi-core processor.

BACKGROUND

Hash table is a fundamental indexing data structure with uses in multiple domains, e.g., data management, graphics, text analytics, bio-informatics. Current state of the art approaches to hash table implementation use an eviction based scheme to insert entries into the hash table, which causes a large number of unnecessary writes and atomic operations. Those approaches also do not use data-parallel features of the processors on which the hash tables are being utilized, resulting in under-utilized system. One or more methodologies are presented in the present disclosure that may reduce the number of writes and atomic operations, exploit processor's data parallelism (e.g., a processor such as GPU's massive parallelism), e.g., without using extra memory.

BRIEF SUMMARY

A method of building and operating a hash table on one or more processors, in one aspect, may comprise allocating a plurality of memory maps on a memory device that represents the hash table to store keys and values, the memory maps comprising at least a primary map and a secondary map, the primary map having a size greater than the secondary map. The method may further comprise performing a hash table operation on the primary map based on a first position computed using a first hash function. The method may also comprise performing a bounded linear probing that probes a defined primary probe region in the primary map responsive to determining that the hash table operation on the primary map on the first position is not successful. The method may also comprise, in response to determining that the hash table operation on the primary map on the first position and the defined primary probe region is not successful, performing the hash table operation on the secondary map based on a second position computed using a second hash function. The method may further comprise performing the bounded linear probing that probes a defined secondary probe region in the secondary map responsive to determining that the hash operation on the secondary map on the second position is not successful.

A system for building and operating a hash table, in one aspect, may comprise one or more processors and a memory device. A plurality of memory maps may be allocated on the memory device that represents the hash table to store keys and values, the memory maps comprising at least a primary map and a secondary map, the primary map having a size greater than the secondary map. The one or more processors may perform a hash table operation on the primary map based on a first position computed using a first hash function. The one or more processors may perform a bounded linear probing that probes a defined primary probe region in the primary map responsive to determining that the hash table operation on the primary map on the first position is not successful. The one or more processors in response to determining that the hash table operation on the primary map on the first position and the defined primary probe region is not successful, may perform the hash table operation on the secondary map based on a second position computed using a second hash function. The one or more processors may perform the bounded linear probing that probes a defined secondary probe region in the secondary map responsive to determining that the hash operation on the secondary map on the second position is not successful.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Design and implementation of a parallel hash table are disclosed in one embodiment. In the description, the design is described with respect to the architectural features of the GPU (Graphics Processing Unit), however, it can be also applicable to other processors, e.g., any traditional multi-core processor.

The hash table is a fundamental indexing structure which provides fast (ideally, constant-time) search capabilities for data represented as key-value pairs. Examples of the common operations supported by hash table are: (1) Insert(key, value), which inserts the (key,value) pair, (2) HasKey(key), which finds out if a particular key is stored in the hash table, (3) GetValue(Key), which returns a value corresponding to the input key, if it is stored, else returns null, and (4) DeleteKey(key), which deletes the input key and the corresponding value. The hash tables have a wide variety of applications, and in particular, they form the core indexing data structure for the data management domain.

Hash tables are probabilistic data structures that exploit randomness to improve data access performance. The insert (key, value) function uses the key as input to a special hash function that computes a position in a linear array (often called as a map). In the ideal scenario (called the perfect hash table), every input key would be mapped to a distinct position in the map. However, in reality, often multiple keys map to the same position, creating a collision. How to avoid such hash key collisions is the one of the most important design factors for hash tables. Hash tables are also memory-bound data structures as memory accesses are designed to be distinct and the memory access pattern is very difficult to predict a priori. Performance of the hash table accesses can be improved by several software and hardware approaches. Many of these approaches exploit capabilities of multi-core processors to make concurrent hash table accesses from multiple threads. In the concurrent scenario, the hash table performance can still be affected by the memory performance, in particular, when multiple threads are operating concurrently.

Graphics Processing Units (GPUs) have been used primarily as compute accelerators to exploit their high compute capabilities. Over the years, the memory performance of GPUs has also increased substantially; the peak memory bandwidth of a recent GPU is 200 gigabytes per second (GB/s), which is more than double of the peak memory bandwidth of a state-of-art multi-core CPU. The improved memory bandwidth makes GPUs suitable for accelerating memory-bound workloads such as hash tables.

In one embodiment of the present disclosure, a parallel hash table is designed and implemented that can insert and query hash maps using multiple threads. The new hashing approach of the present disclosure may include the following features:

1. It uses more than one maps (e.g., 2 or 3) to store the keys and values. The size of the maps may be different. For example, the size of the primary map is around 1.05 times the size of the input data; the sizes of secondary and tertiary maps are far smaller: e.g., the secondary map may be 20% of the input data, and the tertiary map may be 10% of the input data.

2. The algorithm uses bounded linear probing to resolve conflicts. Specifically, upon a conflict, next "k" positions (called probing regions) are scanned for empty slot. The value of "k" depends on the level of maps: each level may have different sized probing regions. If there is no available space within the probing region, lower-level maps are searched.

3. The hashing approach can be extended to support bucketing as well (each entry in the map would correspond to bucket of size "b"). In one embodiment of the present disclosure, to get a balance between space consumption and execution times, only lower-level maps may be implemented to have buckets, and the bucket size may increase based on the depth of the map.

4. The size of the probing region is chosen to match the data access properties of the underlying hardware (e.g., cache line or data transfer size for a processor, e.g., GPUs). Lower-level maps have larger probing regions than the top-level map, e.g., in a common configuration, the size of primary map's probing region may be 4, the secondary probing region may have size 4, and the tertiary probing region may be 8.

5. The hash table design along with the varying probing region sizes enables processor-specific, e.g., GPU-specific, memory access optimizations such as hardware coalescing and cache line sizes. The design also enables using data-parallel functions while querying the data.

In one aspect, the hash table design and implementation of the present disclosure may improve on existing efforts on GPU-based hashing as follows: Currently, the hashing algorithms on the GPU use a variety of cuckoo hashing approaches. All these approaches use the eviction based approaches to address conflicts. The cuckoo hashing technique uses multiple hash functions to find an empty slot. For any key being inserted, a first position is calculated using a hash function. If the target location is already occupied, the existing key-entry is exchanged for the key being inserted. The evicted key is then re-inserted into another table using a different hash function. If the new position is empty, the process terminates with success, else, the existing item in the new position is exchanged like before, and the process repeats.

Unlike the cuckoo hashing, the proposed approach need not evict a key. Also, cuckoo hashing does not perform bounded linear probing. The cuckoo hashing also does not have multiple maps with different probing regions, and different bucket sizes.

Another effort uses Robinhood hashing which also implements the eviction strategy.

The hop-scotch hashing is a related locality-sensitive hashing algorithm (currently working only on multi-core CPUs). The hop-scotch hashing algorithm also uses neighborhood region called hop-scotch region to store items in case of conflicts. However, the hop-scotch algorithm also uses eviction-based approach to find empty slots in the hop-scotch region. This approach does not use linear probing and multiple maps.

Figure 1:
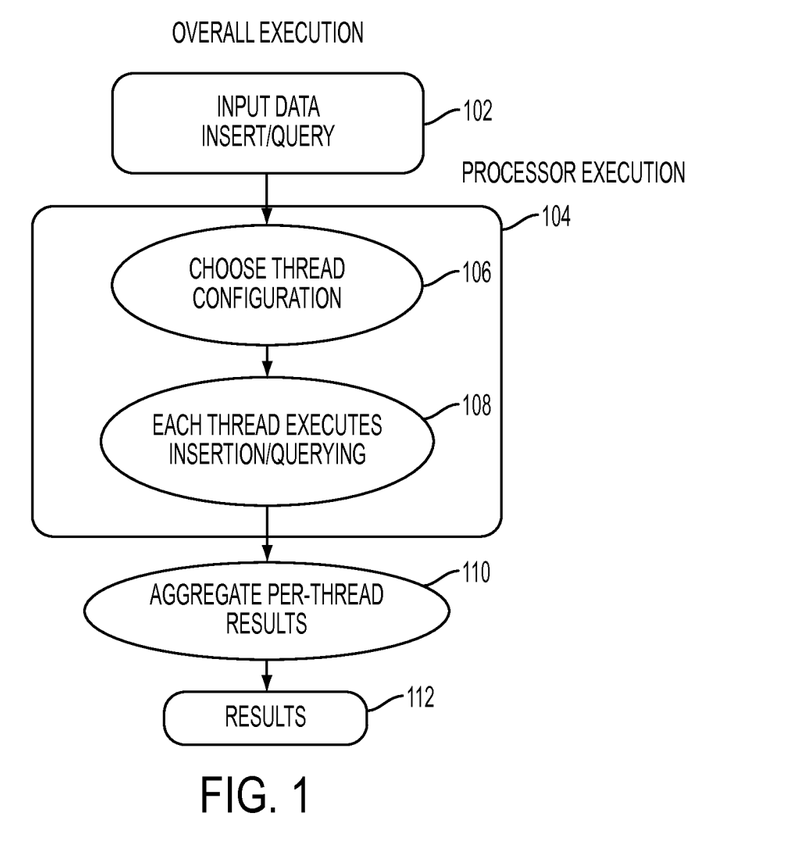
FIG. 1 is a high-level flow diagram that illustrates an overall execution for hash table operations in one embodiment of the present disclosure.

FIG. 1 is a high-level flow diagram that illustrates overall execution for hash table operations in one embodiment of the present disclosure. At 102, input data is received. For instance, an operation to perform on a hash table is received. Such operation may include an insert operation, for inserting data into the hash table; a query operation, for querying for data in the hash table; or other operations to be performed on the hash table. In one embodiment, input data may comprise an operation and an array of (key, value) pairs or a plurality of such key-value pairs, wherein multiple instances of the operation may be performed concurrently or in parallel according to a methodology of the present disclosure in one embodiment. For example, an instance of the operation using a key-value pair in the array may run concurrently with another instance of the operation using another key-value pair in the array, wherein multiple instances run concurrently or in parallel. In another embodiment, the input data may comprise an array of such operations, or multiple such operations, which may be performed in parallel or concurrently according to a methodology of the present disclosure in one embodiment.

The processing shown at 104 may be executed as parallel processing according to a particular processor configuration. For example, a GPU may execute the processing at 106 and 108 using its multiple thread configuration. As another example, one or more CPU with multiple threading capabilities may perform the processing at 106 and 108. Referring to 106, thread configuration associated with the particular processor which would be running the hash table operation is determined or chosen. The processing at 106 identifies the number of threads to be used on a processor for running a hash table operation. For example, a GPU may have thread blocks comprising a number of threads that can be run in parallel. Similarly, a CPU or another processor may have a particular configuration which allows multiple threads to run concurrently in parallel processing.

At 108, each thread in the chosen thread configuration runs a hash table operation, specified in the input data. For instance, each thread may run an operation using different input data; for example, every thread may perform an operation with a distinct key-value pair in the input data. At 108, the results from each of the threads are aggregated, e.g., into an output array of values. At 110, the aggregated result is returned.

As described above, in one aspect, the input data or key-value pairs of the input data may comprise multiple elements, for example, in the magnitude of thousands or more. For example, a GPU which may have a capability of running millions of threads concurrently, would be able to handle running hash table operations using such multiples of input data concurrently according to an embodiment of the present disclosure. The number of input element may vary.

Figure 2:
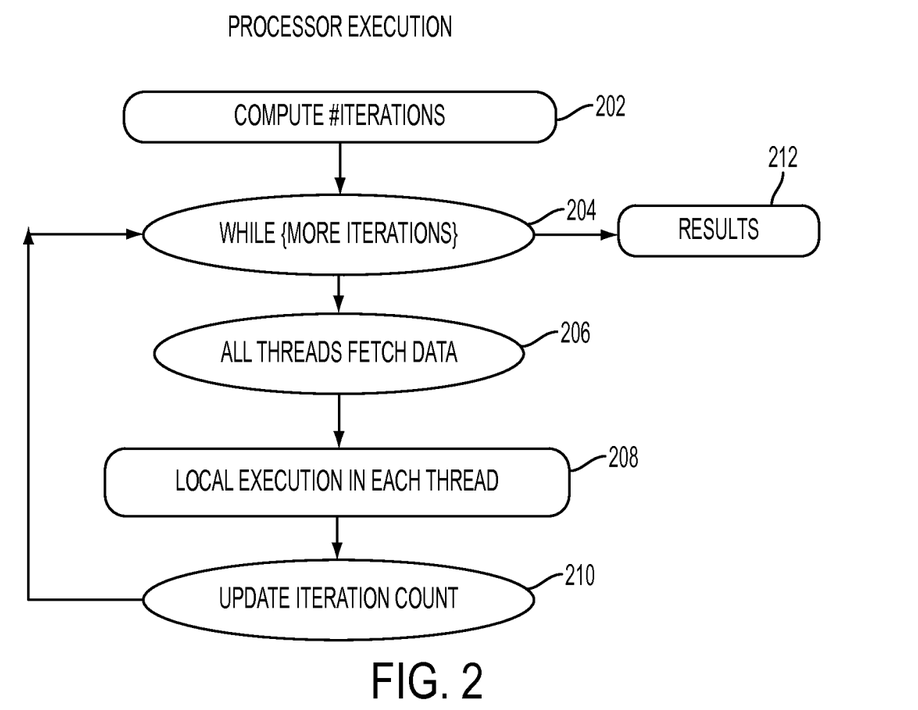
FIG. 2 is a flow diagram illustrating a specific processor execution (e.g., a GPU execution) in one embodiment of the present disclosure.

FIG. 2 is a flow diagram illustrating a specific processor execution (e.g., a GPU execution) in one embodiment of the present disclosure. For instance, the processing shown at 108 in FIG. 1 may perform the algorithm or processing shown in FIG. 2. At 202, number of iterations is computed. The number of iterations in this processing refers to the number iterations the same thread may need to perform a hash table operation. For instance, for the sake of simplicity, consider that the input array has 10,000 elements, or 10,000 operations that need to be performed; and consider that the number of threads identified in the processor configuration is 1,000. Then, the number of iterations in this example would be 10; e.g., a thread may run 10 times or perform 10 hash table operations concurrently with other 999 threads to service the 10,000 operations specified in the input data.

At 204, while there is more iteration, processing at 206, 208 and 210 are performed. At 206, all threads fetch data. For instance, every thread fetches data need for performing its operation, e.g., the input key-value pair. Initially, every thread may also fetch data regarding the specific operation and specific hash table on which to operate, however, if a thread is performing the same operation on the same hash table, but only with different key-value pair at different iterations, this data may be fetched once. At 208, each thread performs the operation in its local execution. A thread's local execution may comprise computing a hash function based on a fetched key of key-value pair and using the hashed valued to find the value associated with the fetched key-valued pair data.

At 210, iteration count is updated, e.g., incremented to the next iteration. The count is updated, for example, when all the threads have finished a particular iteration.

If all the iterations are done, results are output at 212.

Figure 3:
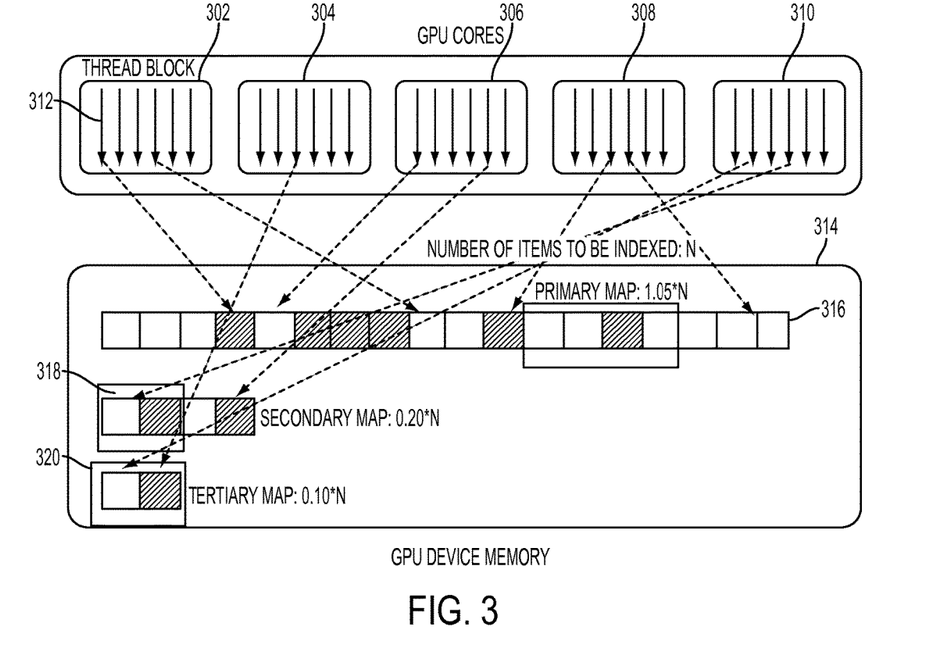
FIG. 3 shows example processor thread and memory configuration, using GPU as an example, in one embodiment of the present disclosure.

FIG. 3 is example processor thread and memory configuration, using GPU as an example. While the figure shows a configuration of a GPU, it should be understood that a methodology of the present disclosure may be applicable to any other type of processors, e.g., including but not limited to a general purpose processor such as a CPU or other special processors. In the example shown, GPU cores may comprise multiple thread blocks 302, 304, 306, 308, 310, 312, each thread block comprising multiple threads (e.g., shown by solid arrow lines 312).

A hash table may be stored in GPU device memory, e.g., as shown at 314. Consider that the number of items to be indexed is N. The number of items to be indexed, e.g., N may be user provided. The hash table may have initial size of as a function of N.

A hash table of the present disclosure in one embodiment may comprise a primary map 316 having first size (e.g., a first predefined multiple of N), a secondary map 318 having second size (e.g., a second predefined multiple of N), and a tertiary map 320 having third size (e.g., a third predefined multiple of N). Generally, the size of the primary map is greater than the size of the secondary map, the size of the secondary map is greater than the size of the tertiary map, and so forth, wherein the size of the maps decrease in the map level hierarchy from top to bottom, the primary map being on the top of the hierarchy. As one particular example, the primary map may have size that is 1.05*N, the secondary map may have size that is 0.20*N, and the tertiary map may have size that is 0.10*N. Different sizes may be used and the sizes of the maps may be configurable.

In one embodiment of the present disclosure, each map is associated with a fixed sized probe region. The size of the probe region may be dependent on the level of the map. Larger is the size of the map, smaller is the associated probe region. For example, the probe regions may be smaller when compared against other probe regions that have smaller maps. For example, in the figure, the primary probe region would have size 4, the secondary probe region size would be 8, and so on.

Shown in FIG. 3, the dashed (or dotted) arrow lines represent threads working concurrently on a particular location in memory 314 independently from one another, performing a hash table operation.

Figure 4:
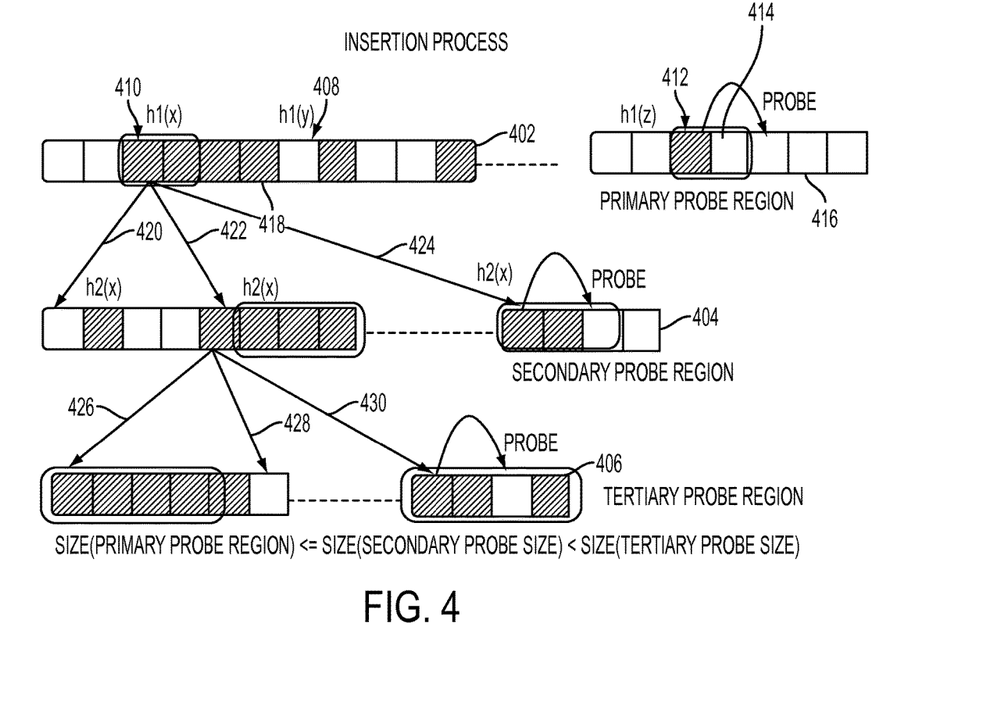
FIG. 4 is a block diagram illustrating a hash table insertion process in one embodiment of the present disclosure.
Figure 5:
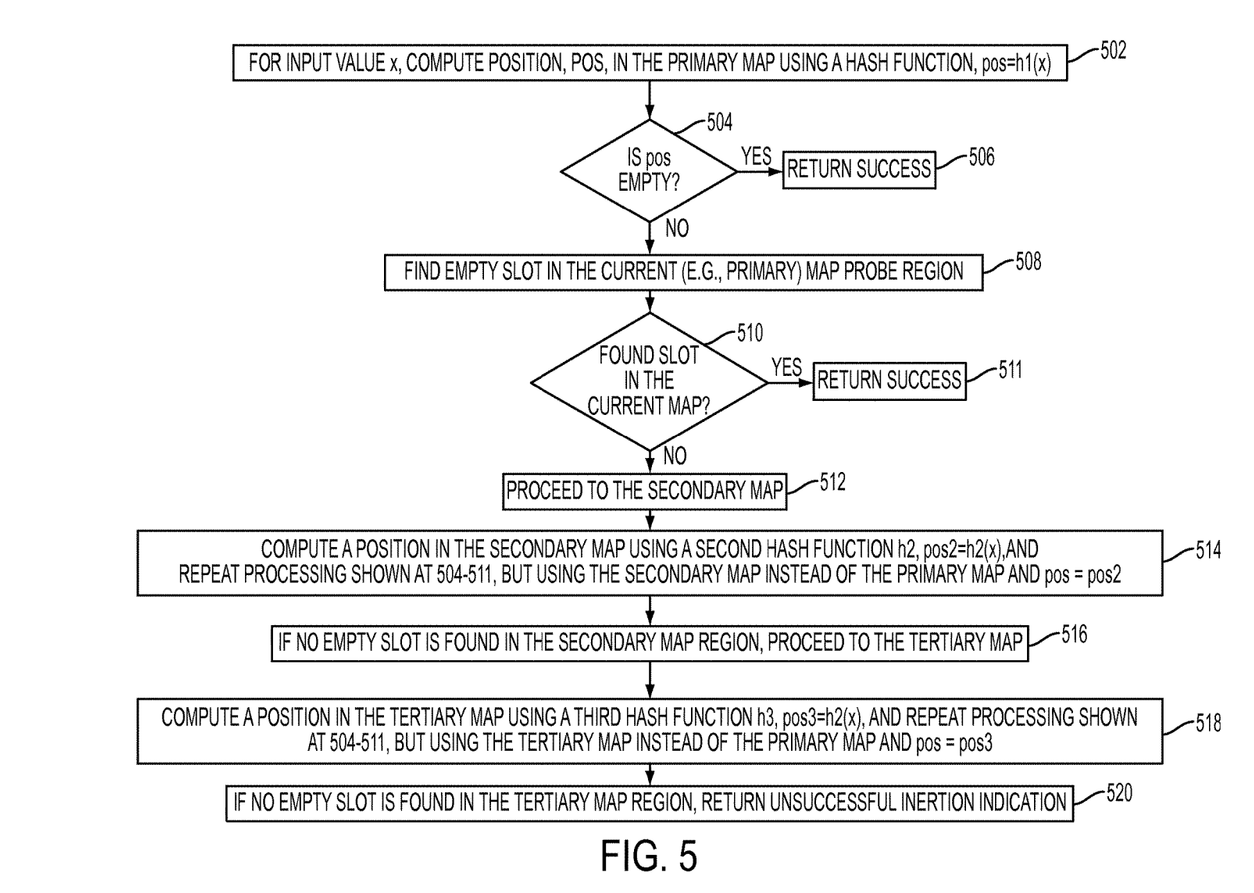
FIG. 5 is a flow diagram illustrating a hash table insertion process in one embodiment of the present disclosure.

FIG. 4 is a block diagram illustrating a hash table insertion process in one embodiment of the present disclosure. FIG. 5 is a flow diagram illustrating a hash table insertion process in one embodiment of the present disclosure. An insertion process in one embodiment of the present disclosure is described with reference to FIG. 4 and FIG. 5 as follows. FIG. 4 shows a primary map and a primary probe region 402; a secondary map and a secondary probe region 404; and a tertiary map and a tertiary probe region 406. Additional levels of maps may be utilized. In the figure, solid elements represent memory locations that are occupied, i.e., hash table element that is filled with a value already. A program that uses the hash table may allocate the memory region with a plurality of maps, e.g., in addition to the primary map, secondary map, tertiary map, and so forth.

Referring to FIG. 5, at 502, for input value x, position in the primary map is computed using a hash function h1, e.g., pos=h1(x). Generally, a value that is hashed, e.g., x in this example, would be an input key, in the input key-value pair; upon finding an empty slot, an input value in the key-value pair would be inserted into the slot. For simplicity, the drawings may show the same notations as both the input key and input value, for example, x as input key and also x as an input value associated with that key. At 504, if map[pos]==0, that is, if the primary map at position 'pos' is empty, return SUCCESS at 506. An example of this case is shown in FIG. 4 at 408, in which a position value computed using hash function h1 with input value y, h1(y) returned a position at 408, and that position in the memory location in the primary region is empty, e.g., shown as white space in the figure. Otherwise, at 508, if map[pos] !=0, that is, the primary map at position 'pos' is not empty, find an empty slot in the primary probing region. For instance, referring to FIG. 4, at 410, h1(x) position is shown as already having another value (shown in solid). Similarly, shown at 412, the position computed for value z, h1(z) is shown as already occupied.

Referring to FIG. 5, at 510, if an empty slot is found, return SUCCESS at 511. This for example is shown with reference to FIG. 4 at 412. Since the position shown at 412 is not empty, another empty slot is searched for and found in the primary map probe region, e.g., in this case the next slot shown at 414. The method of the present disclosure, for instance, may start probing a region that is near or consecutive to the position returned by the hash function (e.g., 412). For instance, region shown at 416 shows a primary probe region. Probe region may be defined, e.g., as the next k consecutive slots from the position returned by the hash function.

Referring to FIG. 5, at 512, if no empty slot is found, proceed to the secondary map (e.g., shown in FIG. 4 at 404). For instance, referring to FIG. 4 at 410, consider as an example scenario, that the primary map or probe region 418 does not have any empty slots. Then, a secondary map would be considered for insertion.

At 514, position in the secondary map is computed using a second hash function h2, pos2=h2(x) and the inserting process described above with respect to the primary map is repeated in one embodiment of the present disclosure, but using the secondary probing region. FIG. 4 shows this example scenario, in which h1(x) in the primary map is shown as not empty, and hence h2(x) is computed for insertion in the secondary map. In the example shown at 420, the position at h2(x) is empty, hence insertion is performed successfully, returning SUCCESS indication. In the example shown at 424, the position at h2(x) is not empty, but probing the secondary probe region results in a successful insertion, i.e., an empty slot is found in the secondary map into which insertion can be made. In the example shown at 422, the position at h2(x) and its neighboring positions (probe region) are full, i.e., have values that occupy the position. In this case, the method proceeds to a tertiary map, e.g., shown at 406.

Referring to FIG. 5 at 516, if no empty slot is found in the secondary map, the processing proceeds to the tertiary map. At 518, position in the tertiary map is computed using a third hash function h3, pos3=h3(x), and the process for insertion for the tertiary map is repeated, but using the tertiary probing region. FIG. 4 shows example scenarios at 426, 428 and 430. The example scenario at 428 shows that the computed position is empty, hence insertion in that slot is successful. The example scenario at 430 shows that although the computed position is not empty, probing the tertiary probe region finds an empty slot, and therefore, insertion is successful. The example scenario at 426 shows that the computed position is not empty, and no other empty slots are found in the tertiary map probe region.

At 520, if no empty slot is found, an indication that the insertion is not successful is returned.

In one embodiment of the present disclosure, the size of the probe regions in the lower levels of memory map may be greater than equal to the size of the probe region or regions in the upper level or levels. For instance, size(primary probe region)<=size(secondary probe size)<size(tertiary probe size).

Figure 6:
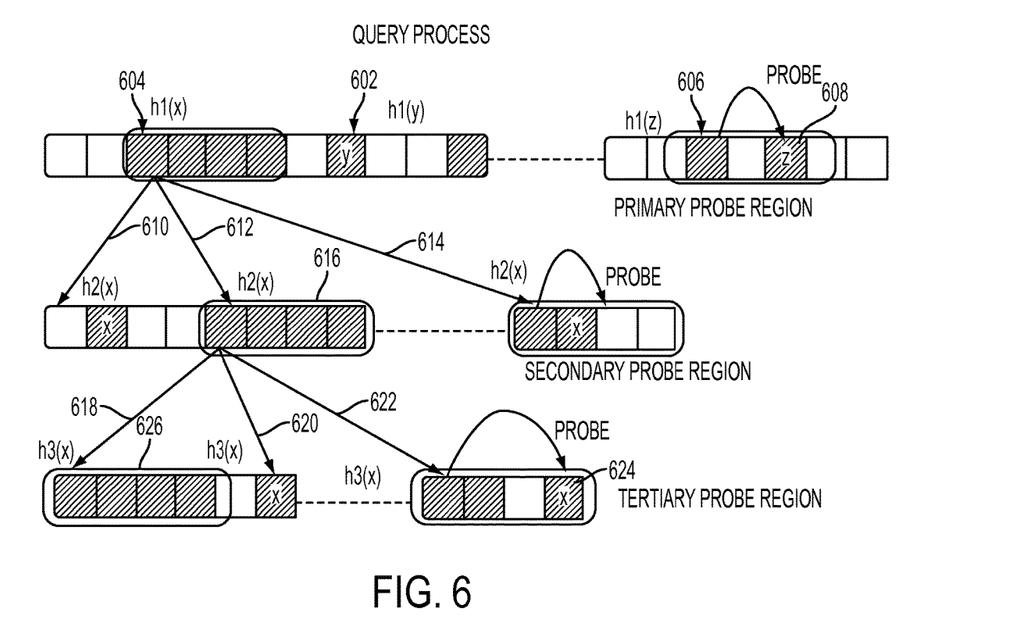
FIG. 6 is a block diagram illustrating a query process in one embodiment of the present disclosure.
Figure 7:
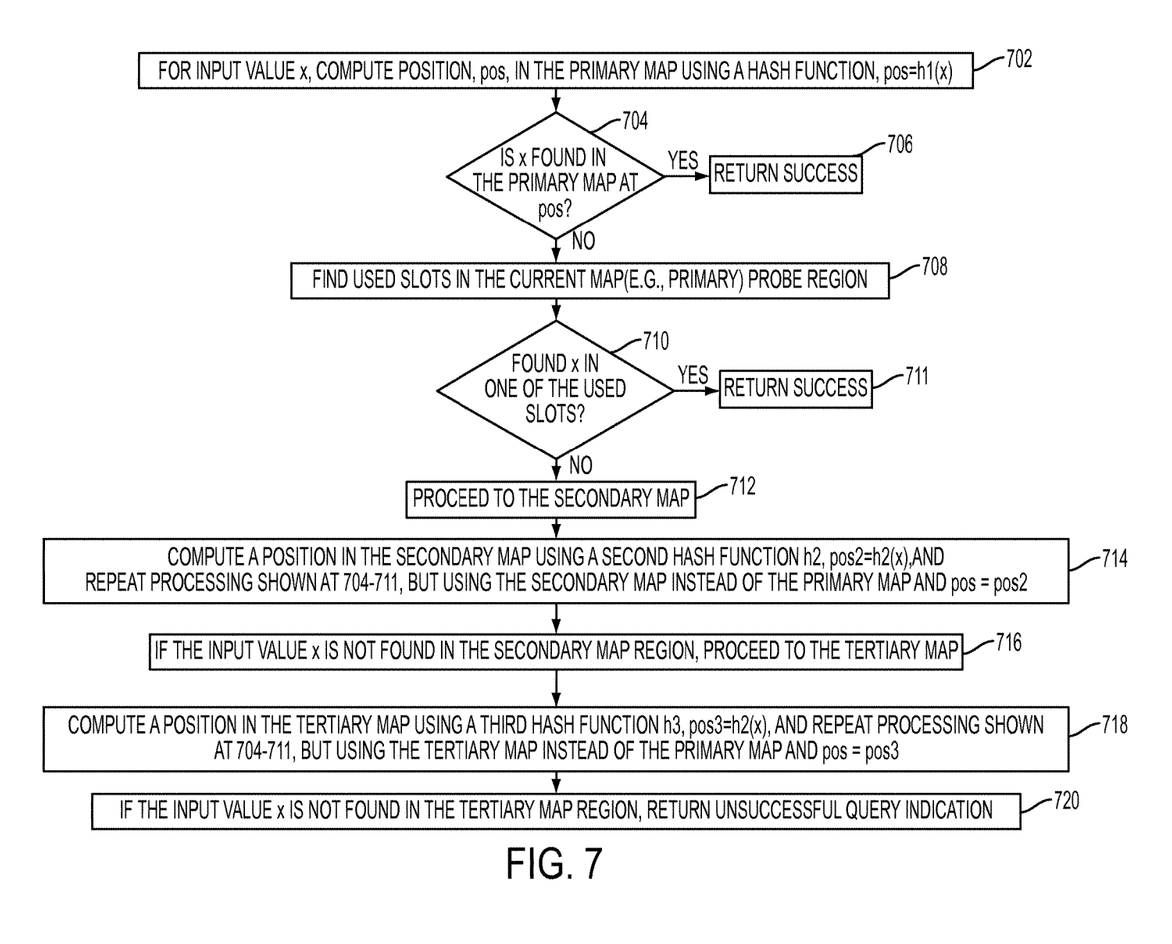
FIG. 7 is a flow diagram illustrating a query process in one embodiment of the present disclosure.

FIG. 6 is a block diagram illustrating a query process in one embodiment of the present disclosure. FIG. 7 is a flow diagram illustrating a query process in one embodiment of the present disclosure. Referring to FIG. 7, at 702, for input value x, a position in the primary map is computed using a hash function h1, pos=h1(x). Generally, a value that is hashed, e.g., x in this example, would be an input key.

At 704, if the input value is found in the position in the primary map (e.g., map[pos]==x), at 706, an indication of SUCCESS is returned. For instance, referring to FIG. 6, consider that the computed position for h1(y) is at 602. That position currently stores a value, e.g., 'y'. Accordingly, the value stored in the computed position matches the value of the query. Hence, query result produces a successful result. In one aspect, the return value may be a binary value, 0 or 1 or indicate whether the queried value is found or not. In another aspect, the return value may be the found value. Whether a binary value and/or the found value is returned may depend on the type of the query operation.

At 708, if map[pos] !=0, i.e., if the position in the primary map is not empty, the method in one embodiment of the present disclosure looks for used slots in the primary probing region. At 710, if one of the values at these slots, matches input key (e.g., x), an indication of SUCCESS is returned at 511.

For instance, referring to the diagram shown in FIG. 6, at 604, consider that in input query is looking for value x. h1(x) returns position at 604. Since this position is not empty, and since the input key value x is not found in this slot, other non-empty slots in the probe region of the primary map is searched for value x. Similarly, in the example shown at 606, consider that an input query is looking for input key value z. h1(z) computes to position at 606. That position does not have the input key value z, however, probing (or searching) the probing region (e.g., next k non-empty slots) finds z (e.g., shown at 608).

If map[pos]==0, i.e., if the position in the primary map is empty, an indication of failure is returned.

If there is no match, at 712, the method in one embodiment of the present disclosure proceeds to the secondary map, for instance, the next map in the level or hierarchy of maps. For instance, referring to the example scenario shown in FIG. 6 at 604, the value x was not found in the primary map, for instance, either in h1(x) position or the probe region.

At 714, position in the secondary map is computed using a second hash function h2, pos2=h2(x), and the processing for querying shown at 704-711 is repeated for the secondary map, using the secondary probing region. If the input value is found in the secondary map, an indication of SUCCESS is returned. Referring to the example scenario shown in FIG. 6 at 610, the query input key value x is found in the position computed by h2(x). Referring to another example scenario shown at 614, while the query input key value x is not found in the position computed by the hash function, probing the probing region finds the query value in that region.

If there is no match, the method in one embodiment of the present disclosure proceeds to the tertiary map at 716. For example, the example scenario shown at 612 shows that the computed position h2(x) or other slots in the secondary probe region do not store the query value (e.g., 616).

At 718, position in the tertiary map is computed using a third hash function h3, pos3=h3(x), and the process shown at 704 to 712 is repeated for querying the tertiary map, but using the tertiary probing region, and an indication of SUCCESS is returned if the input key value is found in the tertiary map. For example, referring to an example scenario at 620 in FIG. 6, the query value is found at the computed position h3(x). In another example scenario shown at 622, although the computed position h3(x) does not have the query value, probing the tertiary probe region finds the value, e.g., shown at 624.

At 720, if there is no match, an indication of FAILURE is returned. For instance, in the example scenario shown at 618 in FIG. 6, the query value is not found in the computed h3(x) position or in any of the slots in the tertiary probe region (e.g., 626).

FIGS. 4 and 6 are generalized to show different example scenarios of the hash function operations in one embodiment of the present disclosure. The examples show a part of a map to illustrate different scenarios that can occur in the hash operation process; FIGS. 4 and 6 are not drawn to scale.

There may be different types of query operations. For example, a query operation for finding a value may return a binary value, for example, whether found or not found (or successful or not successful). Another query operation may return the actual found value. For instance, GetValue(key, value) operation, e.g., returns the corresponding value found in the location hashed with 'key'. Regardless of the type of operations, a methodology of the present disclosure may operate on a primary map and its probe region, and if not successful, operate on a secondary map and its probe region, and if not successful, operate on a tertiary map and its probe region, and so forth.

Using a methodology and/or the hash table memory configuration of the present disclosure, large datasets (e.g., in the order of 100s MByte to GByte may be indexed. The methodology may also exploit massive data-parallelism of the appropriate processor (e.g., GPU) for probing and querying. The methodology of the present disclosure in one embodiment may also improve data access locality while performing query, insert and other hash table operations, e.g., by organizing the memory configuration according to multiples of cache lines. The methodology of the present disclosure may also minimize the use of atomic operations. For example, a known hashing algorithm may invoke atomic_Locks the number of times dependent on the availability of empty slots, which can be large. In the present disclosure, the number of atomic_Locks may be proportional to the number of items inserted. In one aspect, no additional data structure for querying may be needed.

Figure 8:
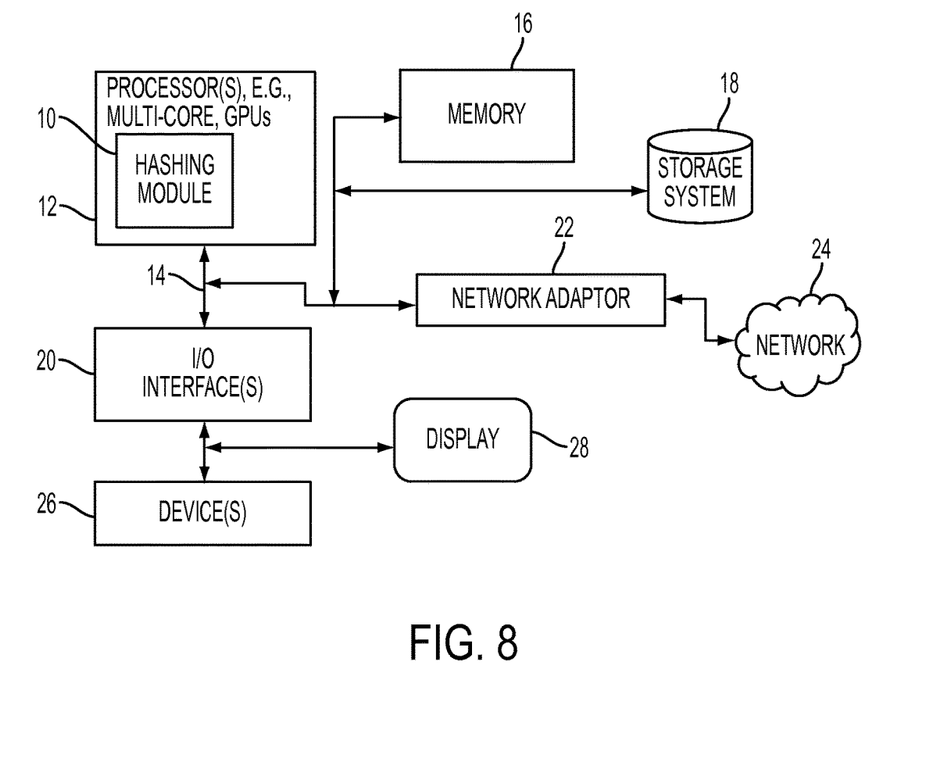
FIG. 8 illustrates a schematic of an example computer or processing system that may implement a hashing system in one embodiment of the present disclosure.

FIG. 8 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a hashing module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A method of building and operating a hash table on one or more processors, comprising:
   allocating a plurality of memory maps on a memory device that represents the hash table to store keys and values, the memory maps comprising at least a primary map and a secondary map, wherein a primary map's size is defined as a first predefined multiple of a number of items indexed and wherein a secondary map's size is defined as a second predefined multiple of the number of items indexed, wherein the first predefined multiple is greater than the second predefined multiple, the primary map associated with a defined primary probe region contained in the primary map and the secondary map associated with a defined secondary probe region contained in the secondary map, wherein the defined primary probe region is smaller than the defined secondary probe region;
   performing a hash table operation on the primary map based on a first position computed using a first hash function;
   performing a bounded linear probing that scans a defined primary probe region in the primary map responsive to determining that the hash table operation on the primary map on the first position is not successful;
   in response to determining that the hash table operation on the primary map on the first position and the defined primary probe region is not successful, performing the hash table operation on the secondary map based on a second position computed using a second hash function; and
   performing the bounded linear probing that scans a defined secondary probe region in the secondary map responsive to determining that the hash operation on the secondary map on the second position is not successful,
   the defined primary probe region and the defined secondary probe region having fixed sizes, the defined primary probe region defined as next k consecutive slots from the first position returned by the first hash function, and wherein the fixed sizes are dependent on a level of the memory maps,
   wherein multiple levels of memory maps are allocated, the multiple levels of memory maps comprising at each level a memory map and an associated probe region.

2. The method of claim 1, wherein the defined secondary probe region comprises a defined number of consecutive positions in the secondary map next to the second position returned by the second hash function.

3. The method of claim 1, wherein the memory maps further comprise a tertiary map, the tertiary map having a size smaller than the primary map, and wherein the method further comprises performing the hash table operation on the tertiary map based on a third position computed using a third hash function responsive to determining that the hash table operation on the secondary map on the second position and the defined secondary probe region is not successful, and performing a bounded linear probing that probes a defined tertiary probe region in the tertiary map responsive to determining that the hash table operation on the tertiary map based on the third position is not successful.

4. The method of claim 3, wherein the defined tertiary probe region has a size greater than the defined primary probe region and the defined secondary probe region.

5. The method of claim 1, wherein the defined primary probe region and the defined secondary probe region have different sizes.

6. The method of claim 1, wherein the primary map's size, the secondary map's size, the defined primary probe regions' size and the defined secondary probe region's size are chosen to match data access properties of the one or more processors.

7. The method of claim 1, wherein the hash operation is received with a plurality of input elements and a plurality of threads running on the one or more processors perform the hash operation on the plurality of input elements concurrently by said plurality of threads all performing said hash operation and resolving steps in parallel.

8. The method of claim 1, wherein no eviction of data occurs during said performing of the bounded linear probing of the defined primary probe region and the defined secondary probe region.

9. The method of claim 1, wherein the hash operation comprises an insert operation to insert an input value and wherein the bounded linear probing is performed to resolve a conflict on said first position or said second position, or combinations thereof.

10. The method of claim 1, wherein the hash operation comprises a query operation to find an input element, and wherein the bounded linear probing is performed responsive to not finding the input element in said first position or said second position, or combinations thereof.

11. A system for building and operating a hash table, comprising:
    one or more processors;
    a memory device;
    a plurality of memory maps allocated on the memory device that represents the hash table to store keys and values, the memory maps comprising at least a primary map and a secondary map, wherein a primary map's size is defined a first predefined multiple of a number of items indexed and wherein a secondary map's size is defined as a second predefined multiple of the number of items indexed, wherein the first predefined multiple is greater than the second predefined multiple, the primary map associated with a defined primary probe region contained in the primary map and the secondary map associated with a defined secondary probe region contained in the secondary map, wherein the defined primary probe region is smaller than the defined secondary probe region,
    the one or more processors performing a hash table operation on the primary map based on a first position computed using a first hash function,
    the one or more processors performing a bounded linear probing that scans a defined primary probe region in the primary map responsive to determining that the hash table operation on the primary map on the first position is not successful,
    the one or more processors in response to determining that the hash table operation on the primary map on the first position and the defined primary probe region is not successful, performing the hash table operation on the secondary map based on a second position computed using a second hash function, and
    the one or more processors performing the bounded linear probing that scans a defined secondary probe region in the secondary map responsive to determining that the hash operation on the secondary map on the second position is not successful, wherein multiple levels of memory maps are allocated, the multiple levels of memory maps comprising at each level a memory map and an associated probe region.

12. The system of claim 11, wherein the defined secondary probe region comprises a defined number of consecutive positions in the secondary map next to the second position returned by the second hash function.

13. The system of claim 11, wherein the memory maps further comprise a tertiary map, the tertiary map having a size smaller than the primary map, and the one or more processors further performing the hash table operation on the tertiary map based on a third position computed using a third hash function responsive to determining that the hash table operation on the secondary map on the second position and the defined secondary probe region is not successful, and performing a bounded linear probing that probes a defined tertiary probe region in the tertiary map responsive to determining that the hash table operation on the tertiary map based on the third position is not successful, wherein the defined tertiary probe region has a size greater than a size of the defined primary probe region and a size of the defined secondary probe region.

14. A computer readable storage medium storing a program of instructions executable by a machine to perform a method of building and operating a hash table on one or more processors, the method comprising:

allocating a plurality of memory maps on a memory device that represents the hash table to store keys and values, the memory maps comprising at least a primary map and a secondary map, wherein a primary map's size is defined as a first predefined multiple of a number of items indexed and wherein a secondary map's size is defined as a second predefined multiple of the number of items indexed, wherein the first predefined multiple is greater than the second predefined multiple, the primary map associated with a defined primary probe region contained in the primary map and the secondary map associated with a defined secondary probe region contained in the secondary map, wherein the defined primary probe region is smaller than the defined secondary probe region;

performing a hash table operation on the primary map based on a first position computed using a first hash function;

performing a bounded linear probing that scans a defined primary probe region in the primary map responsive to determining that the hash table operation on the primary map on the first position is not successful;

in response to determining that the hash table operation on the primary map on the first position and the defined primary probe region is not successful, performing the hash table operation on the secondary map based on a second position computed using a second hash function; and performing the bounded linear probing that scans a defined secondary probe region in the secondary map responsive to determining that the hash operation on the secondary map on the second position is not successful, wherein multiple levels of memory maps are allocated, the multiple levels of memory maps comprising at each level a memory map and an associated probe region.

15. The computer readable storage medium of claim 14, wherein the defined secondary probe region comprises a defined number of consecutive positions in the secondary map next to the second position returned by the second hash function.

16. The computer readable storage medium of claim 14, wherein the hash operation is received with a plurality of input elements and a plurality of threads running on the one or more processors perform the hash operation on the plurality of input elements concurrently by said plurality of threads all performing said hash operation and resolving steps in parallel.

17. The computer readable storage medium of claim 14, wherein no eviction of data occurs during said performing of the bounded linear probing of the defined primary probe region and the defined secondary probe region.

18. The computer readable storage medium of claim 14, wherein the primary map's size, the secondary map's size, the defined primary probe regions' size and the defined secondary probe region's size are chosen to match data access properties of the one or more processors.

* * * * *